(12) United States Patent
Allen et al.

(10) Patent No.: US 7,460,067 B2
(45) Date of Patent: Dec. 2, 2008

(54) SYSTEMS AND METHODS FOR DYNAMICALLY COMPENSATING SIGNAL PROPAGATION FOR FLEXIBLE RADAR ANTENNAS

(75) Inventors: Edward H. Allen, Lancaster, CA (US); Fred L. Reagor, Fort Worth, TX (US); Mary P. Reagor, Fort Worth, TX (US)

(73) Assignee: Lockheed-Martin Corporation, Bethesda, MD (US)

( * ) Notice: Subject to any disclaimer, the term of this patent is extended or adjusted under 35 U.S.C. 154(b) by 238 days.

(21) Appl. No.: 11/005,164

(22) Filed: Dec. 6, 2004

(65) Prior Publication Data

US 2006/0119503 A1     Jun. 8, 2006

(51) Int. Cl.
*H01Q 3/00*    (2006.01)
*H01Q 23/00*   (2006.01)
*G01S 7/40*    (2006.01)
*G01S 13/00*   (2006.01)
*G01S 7/00*    (2006.01)

(52) U.S. Cl. .................. 342/368; 342/165; 342/173; 342/175; 342/195

(58) Field of Classification Search ......... 342/165–175, 342/195, 368–377, 42, 43, 51–55, 73, 74, 342/81, 358, 359, 766, 360; 343/894, 907, 343/912, 915
See application file for complete search history.

(56) References Cited

U.S. PATENT DOCUMENTS

| | | | | | |
|---|---|---|---|---|---|
| 3,803,626 | A | * | 4/1974 | Garrett | 342/165 |
| 5,151,710 | A | * | 9/1992 | de Place | 343/766 |
| 5,341,147 | A | * | 8/1994 | Scott | 342/174 |
| 5,374,934 | A | * | 12/1994 | Miura et al. | 342/360 |
| 5,440,320 | A | * | 8/1995 | Lach et al. | 343/915 |
| H001625 | H | * | 1/1997 | Frankel | 342/375 |
| 6,157,343 | A | * | 12/2000 | Andersson et al. | 342/371 |
| 6,320,538 | B1 | * | 11/2001 | Lalezari et al. | 342/371 |
| 6,333,712 | B1 | * | 12/2001 | Haugse et al. | 342/375 |
| 6,339,399 | B1 | * | 1/2002 | Andersson et al. | 342/372 |
| 6,720,918 | B2 | * | 4/2004 | Reckdahl et al. | 342/358 |
| 6,809,684 | B2 | * | 10/2004 | Brenner | 342/358 |
| 6,954,173 | B2 | * | 10/2005 | Mrstik | 342/173 |
| 7,053,828 | B1 | * | 5/2006 | Goodzeit et al. | 342/359 |

* cited by examiner

*Primary Examiner*—Bernarr E Gregory
(74) *Attorney, Agent, or Firm*—Koestner Bertani LLP; Mary Jo Bertani

(57) ABSTRACT

A system for dynamically compensating signal propagation for flexible radar antennas receives measurement signals indicating the position of selected locations of an antenna array. The future shape of the antenna array at a future time is predicted, and compensation signals are applied to signals generated or received by the antenna elements. The compensation signals are based on the future shape of the antenna array.

22 Claims, 4 Drawing Sheets

SYSTEMS AND METHODS FOR DYNAMICALLY COMPENSATING SIGNAL PROPAGATION FOR FLEXIBLE RADAR ANTENNAS

BACKGROUND

Large, phased-array antennas are often used in spacecraft to support a variety of operations such as reconnaissance missions, collecting radar images, tracking ground-based and air-based targets, and providing high bandwidth communications. There are also plans to use phased-array antennas on high altitude airships and other unmanned platforms. The large, phased-array antennas are made up of a large plurality of independent antenna elements including transmit/receive modules, phase shifters and other elements. Traditionally, the surfaces forming the phased-array antenna had to be maintained very flat or the distortion in the antenna surface had to be known to within a very small fraction of the wavelength corresponding to the operational frequency of the antenna (e.g., one-thirtieth of the wavelength for space-based radar at 10 GHz=1 mm flatness tolerance) in order for the antenna to perform correctly. For example, for space-based RADAR (SBR) applications, a very high degree of surface planarity had to be maintained to enable the effective use of ground clutter suppression algorithms. A high degree of surface planarity was also critical for space-based optics applications and for ground moving target tracking applications. Moreover, a large phased array must be "electrically flat", meaning that electrical components operate on the same schedule (i.e., have the same time constants, be initialized and fired at the same instant, etc.) Even slight latencies or other discrepancies in the operating response of one element with respect to its neighbors, can make an otherwise mechanically flat array appear distorted.

Conventional phased-array antennas achieve this required flatness by using centralized timing signals and high stiffness structural designs (i.e., trusses) that add significant weight and volume to the antenna when it is stowed in a launch vehicle. As can be appreciated, as the antenna area increases, the stowed volume of the array limits the antenna size due to the restrictions imposed by the launch vehicle fairing within which the stowed antenna must fit. A large-scale array antenna (whether for use as radar or any other application) cannot achieve acceptably low structural weight without significant relaxation of planar structural rigidity. This is especially true of an antenna mounted to an airship or other air vehicle. Less rigid antennas will characteristically exhibit a wide spectrum of aero-elastic modes, thereby introducing errors to the signals and reducing the effectiveness of the antennas.

BRIEF DESCRIPTION OF THE DRAWINGS

Embodiments of the present invention may be better understood, and their numerous objects, features, and advantages made apparent to those skilled in the art by referencing the accompanying drawings. The use of the same reference symbols in different drawings indicates similar or identical items.

DETAILED DESCRIPTION OF THE DRAWINGS

Figure 1:
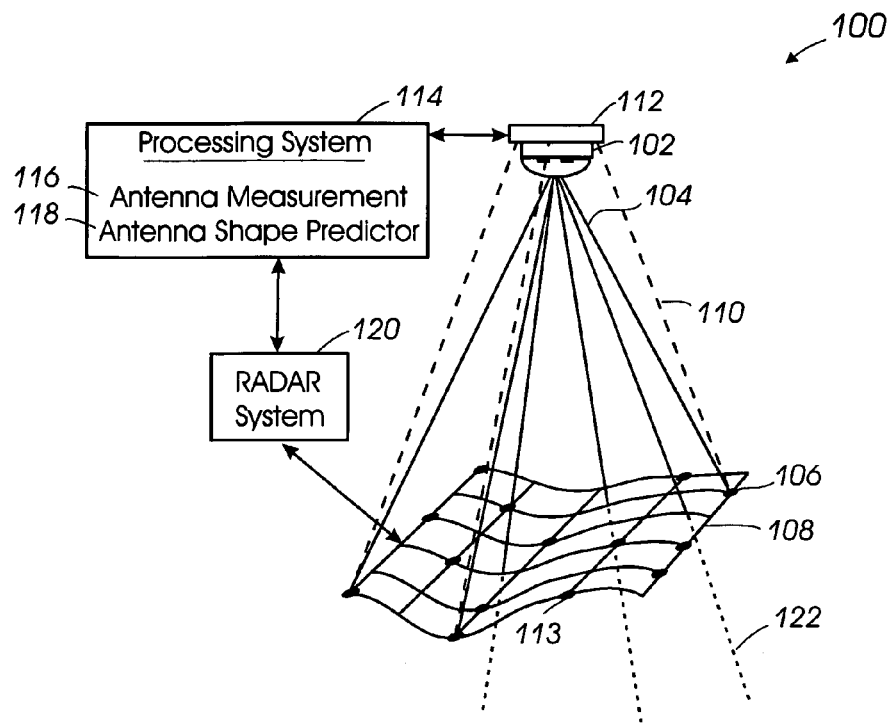
FIG. 1 is a diagram showing portions of a flexible phased array antenna system excited by energy beams to emit communication and/or RADAR signals.

What is desired is a flexible, large phased-array antenna structure that achieves acceptably low weight while maintaining accuracy. Referring to FIG. 1, there is shown a perspective view of a system 100 configured with one or more laser devices 102 to direct light beams 104 at one or more of reflective targets 106 mounted on phased-array antenna 108. Signals 110, such as light beams reflected by targets 106, can be detected by receiver 112. Note that other devices, such as transponders 113, capable of emitting or returning signals 110 in light beams or other types of signals can be used in antenna array 108 in addition to, or instead of, targets 106.

One or more receivers 112 can be co-located with laser device 102 and/or in any other suitable location to detect signals 110. Processing module 114 can include antenna measurement logic 116 that determines the distance between laser device 102 and target(s) 106 based on the time between emission of light beam 104 and reception of corresponding signals 110. Targets 106 and/or transponders 113 can be located in selected positions that allow the shape of phased-array antenna 108 to be determined precisely to a particular level of granularity. The term granularity refers to the number of points that are used to determine the shape of antenna 108. The level of granularity is typically based on the desired accuracy for the operation of antenna 108 and the processing resources available to predict the further shape of antenna 108.

Based on measurements of the antenna shape and analytic models of the behavior of antenna 108, antenna shape predictor (ASP) logic 118 in processing module 114 predicts the shape of phased-array antenna 108 at a future time. RADAR system 120 uses information regarding the predicted shape of phased-array antenna 108 from processing module 114 to generate and apply corrections to RADAR signals 122. RADAR signals 122 corrected on the basis of measurements and predictions are thus accurate for the shape of antenna 108 at the time RADAR signals 122 are transmitted and received.

The ability to predict the shape of phased-array antenna 108 and to construct and timely insert a precise correction signal allows phased-array antenna 108 to be fabricated using a more flexible structure than typically desired for antennas that rely on a rigid structure for accurate operation. A more flexible antenna structure will generally be lighter-weight and require less volume when stowed.

Predicting the future of the shape of any complex structure becomes exponentially more complex and less accurate as the amount of time between the current measured shape and the predicted shape increases. Accordingly, the feasibility of any approach to predicting the shape of phased-array antenna 108 will be proportional to the speed with which the predicted shape and the corrective signals can be synthesized. Note that in ASP logic 118, it may not be necessary to predict the shape and then calculate a corrective signal. There is a one-to-one correspondence between the shape and the required corrective signal, so ASP logic 118 requires fewer computational resources by determining the appropriate predictive corrective signal directly from the current shape measurement.

Figure 2:
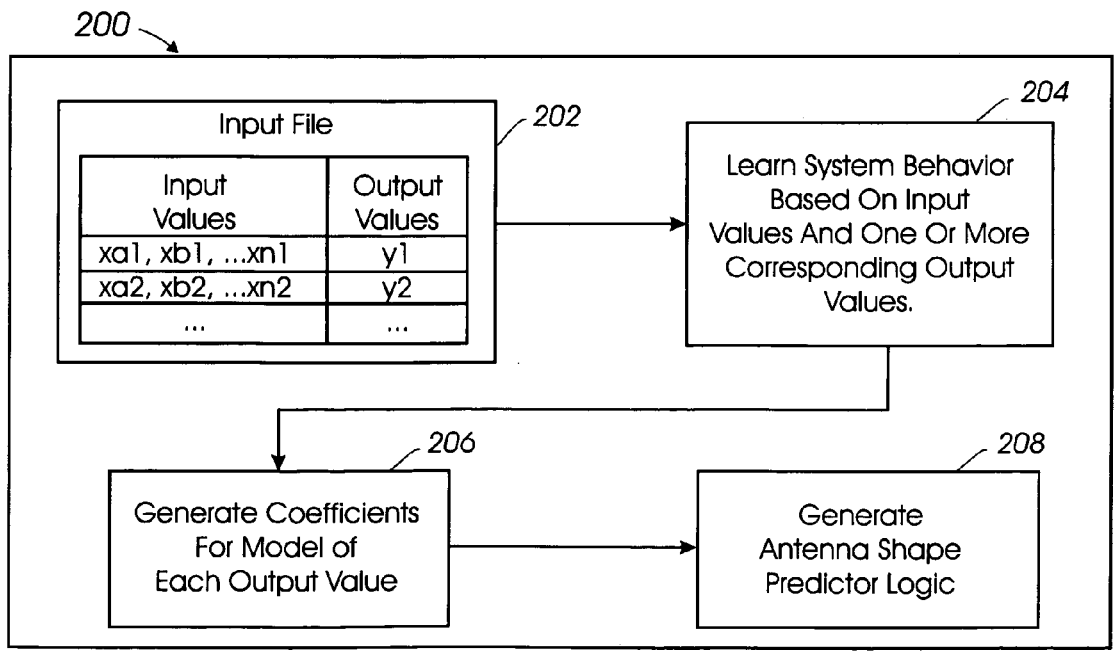
FIG. 2 is a diagram of an embodiment of a process to generate the antenna shape predictor of FIG. 1.

Referring to FIGS. 1 and 2, FIG. 2 shows a flow diagram of an embodiment of model generation process 200 that can be used to generate ASP logic 118 to predict the future shape of phased-array antenna 108.

Any system or structure, (e.g. antenna structure 108), that produces outputs when stimulated with a set of inputs, can be learned and modeled by process 200. Models are created by training on a set of data points. Each data point is comprised of a series of independent variables and a dependent variable. Once the model is developed, it can be used to predict results from new inputs. An example of a commercially available software package that implements process 200 is sold under the trademark DATASCAPE® by Third Millennium Productions, Inc. of Fort Worth, Tex. Other implementations can include commercially available fuzzy logic software, neural network software, matrix algebra software, and other suitable approaches, in addition to, or instead of, DATASCAPE.

In some embodiments, the physical system (or computer model) to be learned can be represented by multiple input values with one or more corresponding output values. Each output value corresponding to the input values is referred to as a "truth" value. The values can be provided in an ASCII file or other suitable format in sub-process 202. In some embodiments, the user can enter and/or select which inputs and outputs to use via a user interface.

In sub-process 204, the behavior of the system is learned for one or more output values at a time along with one or more corresponding input values. Examples of input values could be winds or temperatures. As the learning process proceeds over time, the accuracy of models developed by process 200 converges to the truth values of the data set being learned. Sub-process 206 represents the learned system with a set of coefficients that are used in a generic model to simulate the behavior of the system. Models can be updated by replacing coefficients rather than entire programs, i.e. only the coefficients vary from system to system. Sub-process 208 generates executable logic instructions based on the models of the learned system behavior. Models are produced for the output variables learned. The models are compiled as executable logic instructions and loaded in a processor, such as processing module 114. The models produce the same output, within a measured and user selectable error metric, as the truth values when corresponding input values are provided to the models. Learning characteristically occurs offline, and can be slower than real time. However, because process 200 solutions are so compact, reconstruction of truth values is very fast even for large numbers of inputs, so dramatic speed advantages are possible.

ASP logic 118 produced by process 200 can be used in processing module 114 (FIG. 1). Input values for sub-process 202 can include the measurements between targets 106 and laser device 102 for multiple points over antenna array 108, and other variables that contribute to variance in vibration modes and overall shape, such as temperature and external forces (e.g., wind forces). From these input and corresponding output values, the behavior of the shape of antenna array 108 under various conditions can be learned and modeled as ASP logic 118. ASP logic 118 can be used to extrapolate the present shape of antenna 108 to the shape expected at a future time. In some embodiments, the amount of time into the future that the shape of antenna 108 must be forecast is determined by the amount of time required for RADAR system 120 to form and apply corrections to RADAR signals 122.

If new information is obtained or modifications to ASP logic 118 are required, the change may be implemented by updating a memory table that is utilized by ASP logic 118. An expanded or new input file can be generated, and processes 204 and 206 can be run off-line, generating an updated table of coefficients. This updated table can be provided to ASP logic 118 via any suitable data communication link. For example a Data Transfer Cartridge (DTC) or network communication link can be used. With an updated set of coefficients, the performance of ASP logic 118 is altered. Changes to the software source code are not required, as the updated coefficients are utilized in a generic set of equations. The coefficients can be loaded from a memory table in processing module 114. Thus, process 200 can enable rapid, compact, inexpensive model updates, requiring only that another data set be learned, and a new set of coefficients be provided to ASP logic 118.

Figure 3:
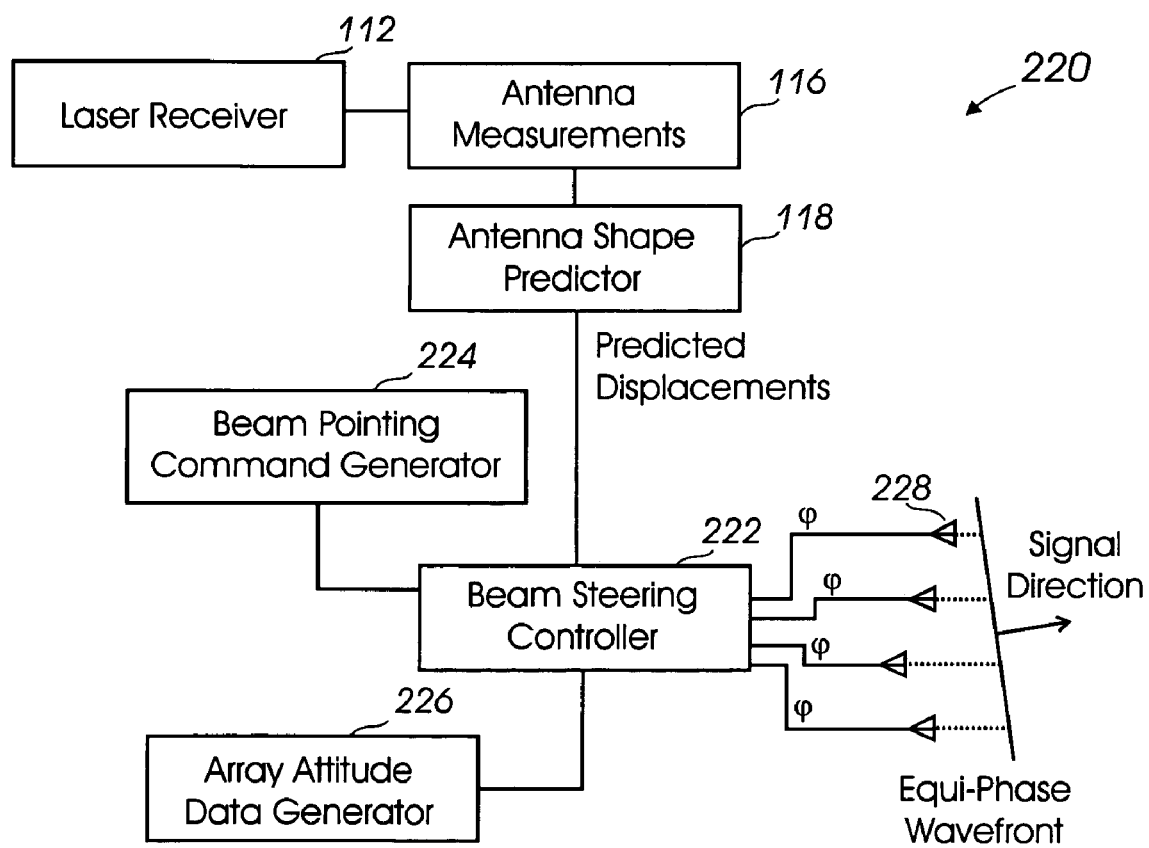
FIG. 3 is a diagram of beam steering controller for a RADAR system configured to receive predicted displacement information from the antenna shape predictor of FIG. 1.

The corrective signals will typically delay and/or steer signals 122 from each antenna element to zero-out the effects of random, dynamic deformations of antenna 108, thereby achieving by electronic means a virtual flat antenna. FIG. 3 shows an embodiment of antenna system 220 in which surface deformations in a large, phased-array antenna 108 can be detected and compensated. The output from laser receiver 112, which includes the amount of time measured between emission of laser beams 104 and reception of the corresponding signals 110 can be provided to antenna measurements logic 116 to determine the shape of phased-array antenna 108. Antenna shape predictor logic 118 determines the shape of phased-array antenna 108 at a future time based on the current shape of antenna 108 and other variables such as temperature, external forces, and the learned behavior of antenna 108 under similar conditions.

The difference between the current shape and predicted shape is determined to provide predicted displacements to beam steering controller 222. Beam steering controller 222 also receives inputs from a beam pointing command generator 224. Beam steering controller 222 can also receive attitude information for antenna 108 from attitude data generator 226, as required.

Beam steering controller 222 can generate a plurality of compensation commands to electronically steer antenna elements 228 in antenna 108 independently. Beam steering controller 222 electronically compensates for the predicted surface displacements by adding phase shift and/or time delay to signals transmitted from and received by antenna 108. By the time the compensation commands are determined and applied to antenna elements 228, antenna 108 is likely to have the shape predicted by antenna shape predictor 118. As a result, the compensated signals may be as accurate as signals transmitted by and received from a flat antenna. Errors in antenna element locations can be corrected by a phase offset equal to the mechanical offset distance in the beam propagation direction at the operating frequency of antenna 108. Thus, antenna system 220 combines accuracy with the benefits of reduced structural requirements for a flexible antenna.

Note that any suitable prediction method can be utilized to predict the shape of phased-array antenna 108, in addition to, or instead of, process 200. In some embodiments, antenna model process 200 can be included in processing module 114 to enable periodic updates to antenna shape predictor 118 to be performed without an operator. In such embodiments, the predicted shape of antenna 108 can be compared to the actual shape of antenna 108 over time. An update to antenna shape predictor logic 118 can be performed when the difference between the actual and predicted shape of antenna 108 is above a desired threshold.

Once mechanical flatness is synthetically imposed on the antenna 108, the corrections for electrical flatness can be computed by advanced processing algorithms that compare the return of the background portion of the radar image (clutter) to a "truth image" and correct for any discrepancies. The term "truth image" refers to the mean or running average of previous images for targets that remain constant (that is, components of the radar image that have no Doppler signature).

Figure 4:
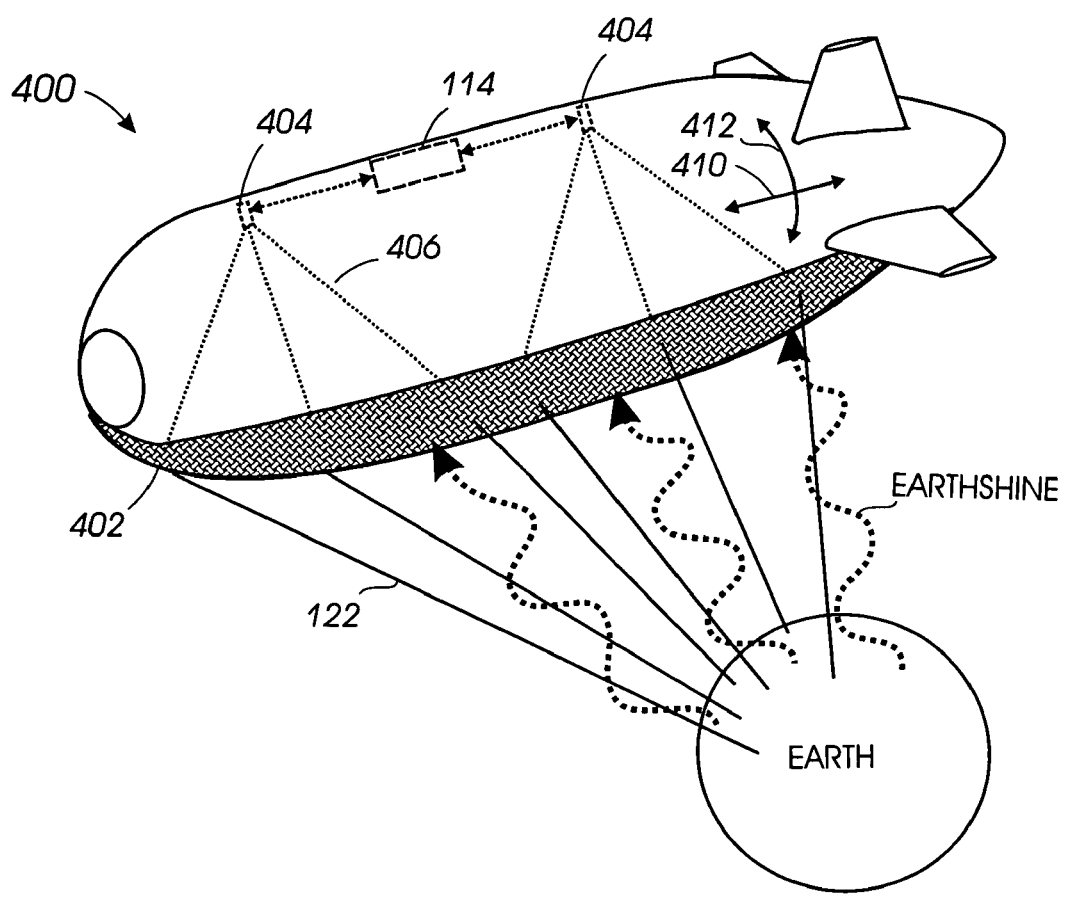
FIG. 4 is a perspective view of an embodiment of an airship configured with Thermophotovoltaic (TPV) fibers capable of functioning as a large phased-array antenna.

Referring to FIGS. 1 and 4, FIG. 4 shows a perspective view of an embodiment of an airship system 400 configured with thermo-photovoltaic (TPV) material 402 that is capable of functioning as phased-array antenna 108. Actuating systems 404 are spaced at selected locations within airship system 400 to transmit energy beams 406, such as laser beams, at multiple points throughout airship system 400. The regions of the TPV material 402 excited by energy beams 406 can radiate RF waves, shown as signals 122. Any desired locations over the entire area of TPV material 402 can be made to radiate as an active phased-array antenna 108 by appropriate regulation, localization, and control of energy beams 406.

The sensitivity of TPV material 402 can be adjusted by subjecting TPV material 402 to an electric field to absorb a desired wavelength of infrared emissions, such as heat radiated into space from the earth that is referred to as earthshine. Airship system 400 can include one or more actuating systems 404 that emit energy beams 406 to modulate current flowing through TPV material 402 directly by imposing an additional external electric field or indirectly by means of deforming piezoelectric material incorporated in TPV material 402. An advantage of such an antenna is that it can be constructed, virtually, on the surface of any suitable device, such as airship system 400, without wiring to carry power or signals to the active elements on the array. Such an antenna can also be rapidly adjusted to whatever shape, form, or size optimizes the intended functional and frequency requirements.

Figure 5:
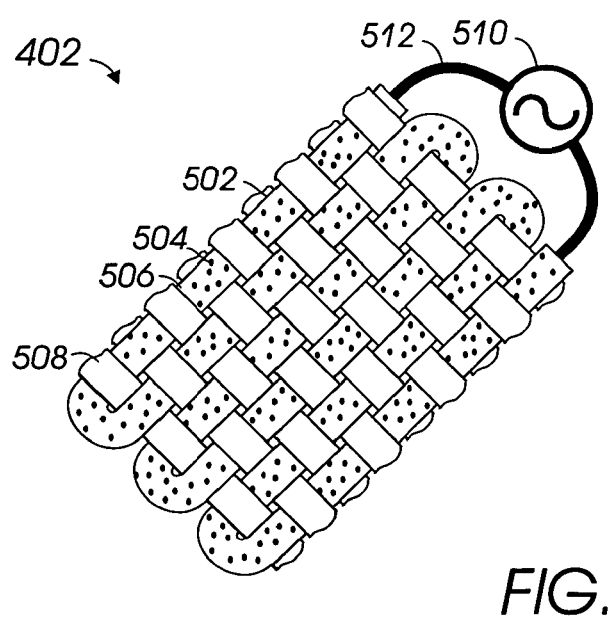
FIG. 5 is a diagram of an embodiment of a woven TPV material configured to provide power to a device, such as the airship system of FIG. 4, as well as function as a flexible phased-array antenna.

Referring to FIGS. 4 and. 5, FIG. 5 shows an embodiment of a portion of woven TPV material 402 incorporating TPV fiber 502. TPV fiber 502 includes one or more TPV cells, shown as quantum dots (QDs) 504, embedded in a material capable of generating an electric field, such as piezoelectric material 506. Other suitable materials can be utilized in TPV material 402 in addition to, or instead of, QDs 504 and piezoelectric material 506. TPV material 402 is further described in U.S. patent application Ser. No. 10/881,890 entitled "Systems and Methods for Converting Heat to Electrical Power", filed Jun. 29, 2004.

Various types of piezoelectric materials 506 including diverse types of polymeric structural fibers generate an electric charge when mechanically strained. Strain arises naturally in the material surrounding airship system 400 due to density, pressure, and temperature gradients within and outside airship system 400. TPV material 402 can be deformed in multiple directions simultaneously arising from bending and elastic modes, shown symbolically for example as arrows representing longitudinal stress 410 and hoop stress 412.

An electrical field is generated as piezoelectric material 506 deforms under the energy absorbed, as well as when the energy beam 406 is removed and piezoelectric material 506 relaxes to ambient conditions. If current is flowing through TPV material 402, the energy beam 406 in a local region of piezoelectric material 506 will modulate the electric field applied by the piezoelectric material 506 to the TPV material 402 and thus modulate the flow of current in the TPV material 402.

TPV fiber 502 takes advantage of the Stark effect, which refers to the red shift in, and broadening of, the spectral line structure of a material in the presence of an electric field. At present, QDs 504 can be fabricated that are sensitive to radiation wavelengths up to approximately 8 or 9 microns. Since most of the energy in earthshine has a wavelength of between 8 and 40 microns, the Stark Effect can be used to shift the sensitivity of QDs 504 to sense radiation at the longer wavelengths, for example into the region of the earth's radiation.

Actuating systems 404 can additionally be used as an adjunct mechanism to deform TPV material 402 based on power requirements. Any suitable type of actuating system 404 can be utilized to modulate the current including various types of lasers (for example, laser device 102), masers, ultrasonic beams, and/or any other system that generates energy beams that can be used to accelerate or decelerate electrons.

Additionally, reflections of signals generated by actuating system 404 or other suitable sensor system can be detected to provide information regarding the location of targets 106 to antenna measurement system 116, in addition to, or instead of signals 110 generated by laser device 102.

Note that phased-array antenna 108 can be fabricated with other types of materials, in addition to, or instead of TPV material 402.

Referring to FIGS. 1 and 4, in some embodiments, a free space laser system (including laser device 102 and receiver 112 in system 100) can serve multiple purposes, including data transfer between RADAR system 120 and antenna 108, airship monitoring and control, as well as other suitable functions. The use of a free space laser system can eliminate much of the internal wiring of airship system 400 or other platform.

Figure 6:
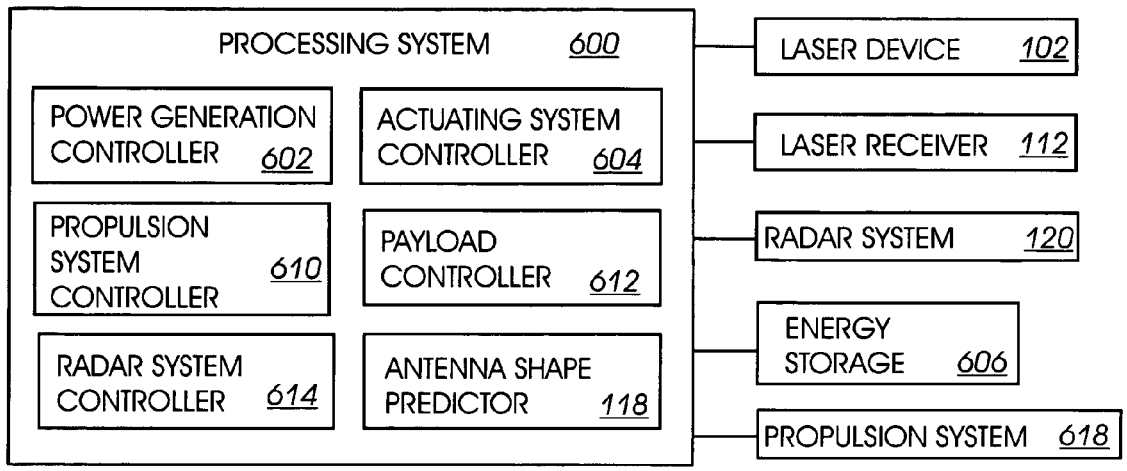
FIG. 6 is a diagram of an embodiment of a processing system that can be included in a device that incorporates a flexible phased-array antenna.

Referring to FIG. 6, an embodiment of an on-board processing system 600 that can be included in a device that incorporates an antenna 108 comprising TPV fibers 502 is shown. In addition to antenna measurement logic 116 and antenna shape predictor 118, power generation controller 602 can be included to determine the power requirements of the device. Actuating system controller 604 can be included to control the number, direction, and intensity of energy beams to generate an electrical field for TPV fibers 502 based on the reserve power available in energy storage subsystem 606 and the power that can be provided by TPV fibers 502.

Components in processing system 600 can be embodied in any suitable computing device(s) using any suitable combination of firmware, software, and/or hardware, such as microprocessors, Field Programmable Gate Arrays (FPGAs), Application Specific Integrated Circuit (ASICs), or other suitable devices.

Figure 7:
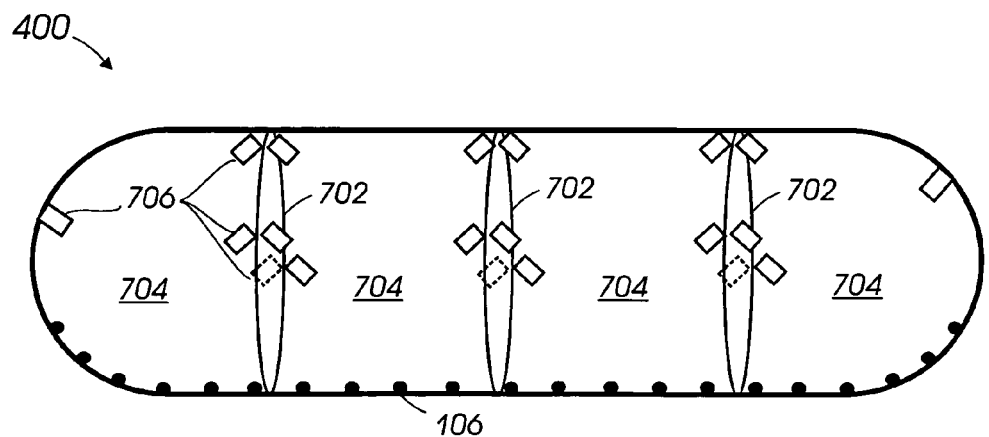
FIG. 7 is a cross-sectional side view of an embodiment of an airship configured with multiple compartments and free-space optical matrices.

FIG. 7 shows a cross-sectional view of an embodiment of airship system 400 configured with baffles 702 that separate airship system 400 into four internal compartments 704. Compartments 704 can include free-space optical matrix 706 that can perform the functions of actuating systems 404 (FIG. 4) and/or one or more antenna elements 228 (FIG. 3). Optical matrices 706 can be spaced at selected locations within airship system 400 to transmit and receive communication signals and metrology signals at multiple points throughout airship system 400.

One or more optical matrices 706 can perform central processing functions that handle information to and from multiple optical matrices 706 to achieve a complete, coherent, phased-array antenna 108. Actively mode-locked signal transmitters can be used to broadcast clock/trigger signals and provide a precise timing reference for the phase delay of antenna elements 228. Additionally, optical matrices 706 can include metrology components that transmit/receive operational health status and relative position information of targets 106, and communication components that transmit/receive communication signals external to airship system 400.

In some embodiments, signal transmitters and signal detectors can be unpowered or passive most of the time to conserve battery power. Low power dissipating, integrated signal transmitters and signal detectors that can be used in elements have been fabricated on the same epitaxial material by Sandia National Laboratories in Sandia, N. Mex. Sandia Laboratories have demonstrated signal transmitter/detector pairs using a 2 milliwatt laser interrogator at 1.3 microns communicated at 1 GHz rates at over 100 meter distances. During communication, the signal transmitter/detector pairs consume a few microwatts and virtually no power while in standby mode. Relatively large angles of laser interrogation (30 degrees) can be achieved with micro-corner cube reflectors, cat's eye optical lenses, and/or other suitable optical components. Other suitable signal transmitters and signal detectors can be utilized, however.

The ability to reduce the mass and volume of antenna 108 due to the lesser stability requirements for the structure supporting antenna 108 allows larger phased-array antennas 108 to be packaged with existing launch vehicles when antenna 108 is to be used in a space-based application, thus enabling new missions previously considered impossible or economically unviable. The elimination of the need for ultra-stable, high tolerance support structures for supporting large, phased-array antennas 108 also permits a significant reduction in the mass of a phased-array antenna 108.

Additionally, optical beams, such as light beams 104 and signals 110, may cross each other as well as RADAR signals 122, and be routinely reconfigured without crosstalk concerns. Moreover, an optical communication link provides high-bandwidth over moderate distance to query as many as 10,000,000 or more elements, and transmit/receive high-bandwidth signals for antenna 108.

It should be noted that because some components of embodiments disclosed herein can be computer-implemented, various components may range from computer executable logic instructions as part of computer readable media to hardware used to implement the processes described herein, as well as combinations of hardware, firmware and/or computer executable logic instructions.

Further, embodiments described in terms of a method or process, a system, an application, a type of software, or as computer readable media having computer executable instructions stored thereon, are intended to include "instructions" such as program modules, routines, programs, objects, components, data structures, etc. that perform particular tasks within a computing environment. Executable instructions may comprise instructions and data which cause a general purpose computer, special purpose computer, or special purpose processing device to perform a certain function or group of functions.

In addition, computer readable media may comprise any available media which can be accessed by a general purpose or special purpose computer. By way of example and not limitation, such computer readable media includes any type of RAM (SDRAM, ESDRAM, etc.) or ROM (EPROM, EEPROM, FEPROM, EAROM, etc.) stored on any physical medium, including a computer chip, a server, or a disk. Disks can include optical storage devices (e.g., CD-ROMs or DVD-ROMs), magnetic storage devices, or any other medium that can be used to store the desired executable instructions or data fields and which can be accessed by a general purpose or special purpose computer. Combinations of any of the above-named media are also included within the scope of computer readable media.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed:

1. A system comprising:
   a computer program on computer readable medium operable to:
      receive measurement signals indicating the position of selected locations of an antenna array;
      predict the future shape of the antenna array at a future time; and
      apply compensation signals at that future time to signals generated or received by at least one antenna element, wherein the compensation signals are based on the future shape of the antenna array; and
   a computer processor operable to execute the computer program.

2. The system of claim 1, further comprising:
   a sensor system operable to provide information that is used to determine the current shape of the antenna.

3. The system of claim 2, further comprising:
   antenna measurement computer program on computer readable medium operable to receive the information from the sensor system and determine the current shape of the antenna array.

4. The system of claim 2, wherein the sensor system is a free space laser measurement system.

5. The system of claim 4, further comprising:
   a receiver configured to detect laser beams reflected from one or more targets.

6. The system of claim 1, wherein the computer program operable to predict the shape of the antenna array at a future time includes:
   a table of coefficients; and
   an antenna model operable to determine the predicted shape of the antenna array based on the coefficients and the current shape of the antenna array.

7. The system of claim 1, wherein the computer program operable to predict the shape of the antenna array at a future time includes:
   information including a plurality of input values and one or more output values corresponding to the input values; and
the computer program is further operable to:
   learn the behavior of the antenna array based on the input and output values;
   generate coefficients for a model of each output value; and
   generate computer executable logic operable to predict the shape of the antenna array at the future time.

8. The system of claim 1, wherein the compensation signals correct phase shift errors in the signals generated and received by the antenna array.

9. The system of claim 1, wherein the compensation signals correct time delay errors in the signals generated and received by the antenna array.

10. The system of claim 1, further comprising the antenna array.

11. The system of claim 10, further comprising the antenna array, wherein the antenna array includes thermo-photovoltaic (TPV) material operable to radiate the signals when the TPV material is excited by an energy beam.

12. The system of claim 11, wherein the antenna array forms at least a portion of structure for a device.

13. The system of claim 12, wherein the device is an airborne device.

14. The system of claim 10, further comprising a RADAR system coupled to the antenna array.

15. A method comprising:
predicting the shape of a flexible antenna array at a future time based on the current shape of the antenna array and output from computer-executable logic instructions that model the behavior of the antenna array; and
generating compensation signals configured to correct signals to be generated by the antenna array at the future time, wherein the compensation signals are based on the predicted shape of the antenna array.

16. The method as set forth in claim 15, wherein predicting the shape of the antenna array is further based on a set of coefficients that are used in the model of the antenna array.

17. The method as set forth in claim 16, further comprising:
utilizing a plurality of input values and one or more output values corresponding to the input values to learn the behavior of the antenna array; and
updating the coefficients based on the learned behavior of the antenna array.

18. The method as set forth in claim 15, wherein the antenna array comprises TPV material and the antenna array generates the signals when the TPV material is excited by an energy beam.

19. The method as set forth in claim 15, wherein the signals include RADAR signals.

20. The method as set forth in claim 15, further comprising:
predicting the shape of a flexible antenna array at a future time based on external forces acting on the antenna array.

21. The method as set forth in claim 15, further comprising:
predicting the shape of a flexible antenna array at a future time based on the temperature of the antenna array.

22. An apparatus comprising:
means for predicting the shape of a flexible antenna array at a future time based on the current shape of the antenna array and output from a model of the antenna array; and
means for generating compensation signals configured to correct signals to be generated by the antenna array at the future time, wherein the compensation signals are based on the predicted shape of the antenna array.

* * * * *